United States Patent
Mason et al.

(10) Patent No.: US 9,068,852 B2
(45) Date of Patent: Jun. 30, 2015

(54) VEHICLE FLEET ROUTING SYSTEM

(71) Applicant: Telogis, Inc., Aliso Viejo, CA (US)

(72) Inventors: Ralph James Mason, Christchurch (NZ); Mark Fryer, Lincoln (NZ); David John Mitchell, Austin, TX (US)

(73) Assignee: TELOGIS, INC., Aliso Viejo, CA (US)

( * ) Notice: Subject to any disclaimer, the term of this patent is extended or adjusted under 35 U.S.C. 154(b) by 52 days.

(21) Appl. No.: 13/763,533

(22) Filed: Feb. 8, 2013

(65) Prior Publication Data

US 2013/0297207 A1    Nov. 7, 2013

Related U.S. Application Data

(60) Provisional application No. 61/596,538, filed on Feb. 8, 2012.

(51) Int. Cl.
*G01C 21/34* (2006.01)
*G08G 1/00* (2006.01)
*G06Q 10/04* (2012.01)

(52) U.S. Cl.
CPC ............ *G01C 21/3453* (2013.01); *G01C 21/34* (2013.01); *G01C 21/3407* (2013.01); *G08G 1/202* (2013.01); *G06Q 10/047* (2013.01)

(58) Field of Classification Search
CPC ............... G01C 21/34; G01C 21/3453; G01C 21/3407; G01C 21/3423; G01C 21/3446; G01C 21/3461; G06Q 10/047; G08G 1/202
USPC ......................................... 701/533, 410, 467
See application file for complete search history.

(56) References Cited

U.S. PATENT DOCUMENTS

| | | | |
|---|---|---|---|
| 5,712,788 A * | 1/1998 | Liaw et al. .................... | 701/533 |
| 6,680,694 B1 | 1/2004 | Knockeart et al. | |
| 7,110,879 B2 * | 9/2006 | Friedrichs et al. ............ | 701/421 |
| 8,510,040 B2 | 8/2013 | Nesbitt | |
| 2003/0158652 A1* | 8/2003 | Friedrichs et al. ............ | 701/202 |
| 2011/0251783 A1* | 10/2011 | Doi ............................... | 701/200 |

OTHER PUBLICATIONS http://www.stonybrook.edu.libmap/metadata.htm;    MAGERT, Metadata Primer for Map Librarians; last accessed on Nov. 22, 2011, in 4 pages.

(Continued)

*Primary Examiner* — John Q Nguyen
*Assistant Examiner* — Nadeem Odeh
(74) *Attorney, Agent, or Firm* — Knobbe, Martens, Olson & Bear LLP

(57) ABSTRACT

A vehicle management system is described herein that can perform a variety of features related to managing fleets of vehicles. For example, the vehicle management system includes a routing module that can perform a variety of functions. Some of these functions can include determining a first route between locations using a simplified routing network and then determining a second route between the locations using a more exhaustive routing network. Further, the routing module can store information about the natural flow through intersections, improving control of routes through intersections. Some or all of these features may be used together, or any of these features may be omitted in any given embodiment.

16 Claims, 17 Drawing Sheets

(56) References Cited

OTHER PUBLICATIONS http://code.google.com/apis/maps/documentation/directions/; Google Maps API Web Services; The Google Directions API; last accessed on Nov. 22, 2011, in 10 pages.

http://faculty.unlv.edurjensen/gisdata/navteq/NAVTEQ_DIGITAL_MAP_OVERVIEW_DEVELOPER_GUIDE.pdf; NAVTEQ, published Apr. 9, 2007, in 38 pages.

* cited by examiner

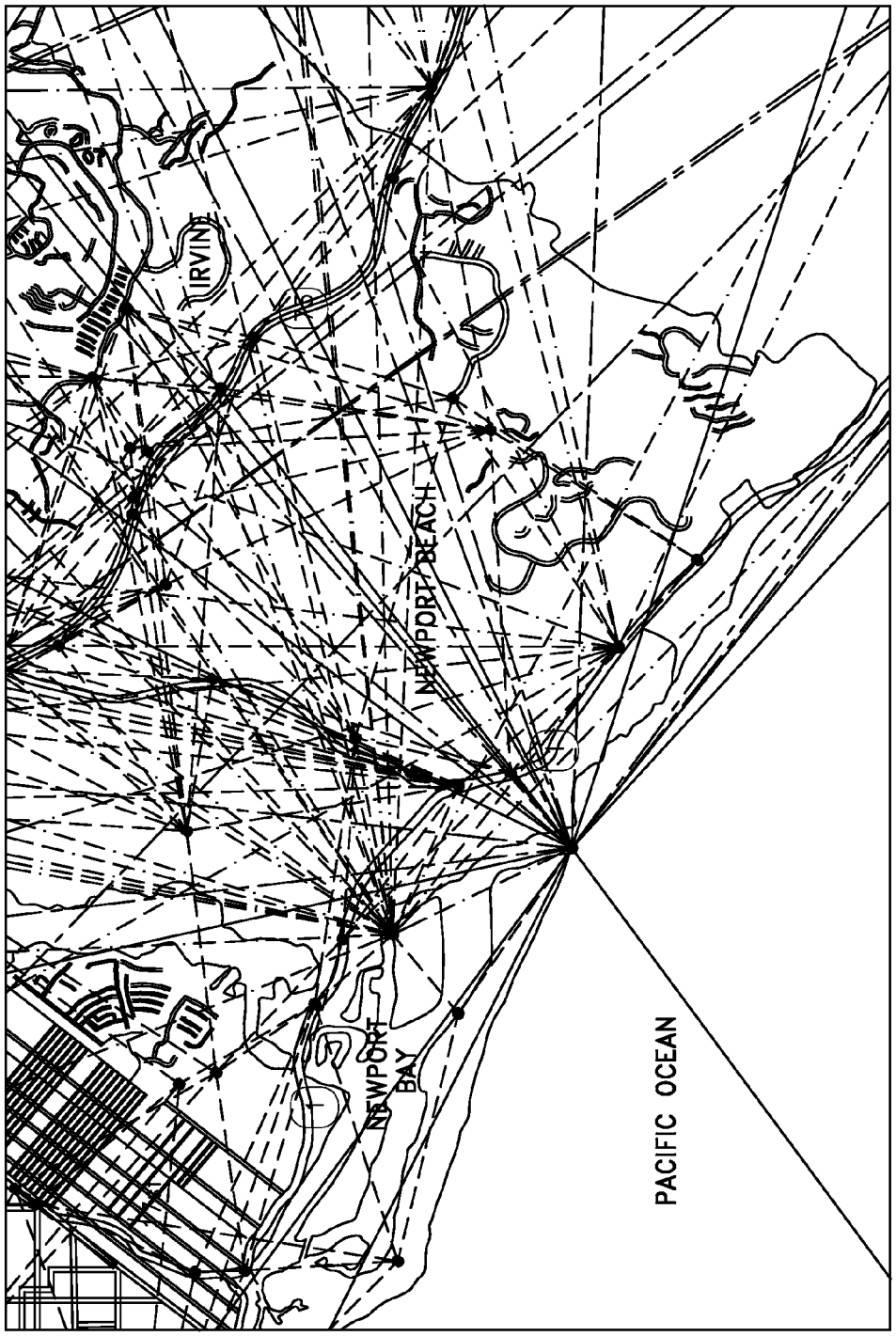
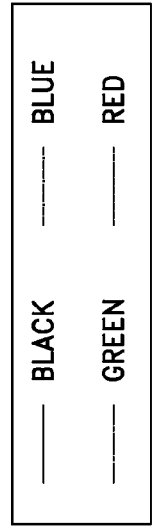
FIG. 3

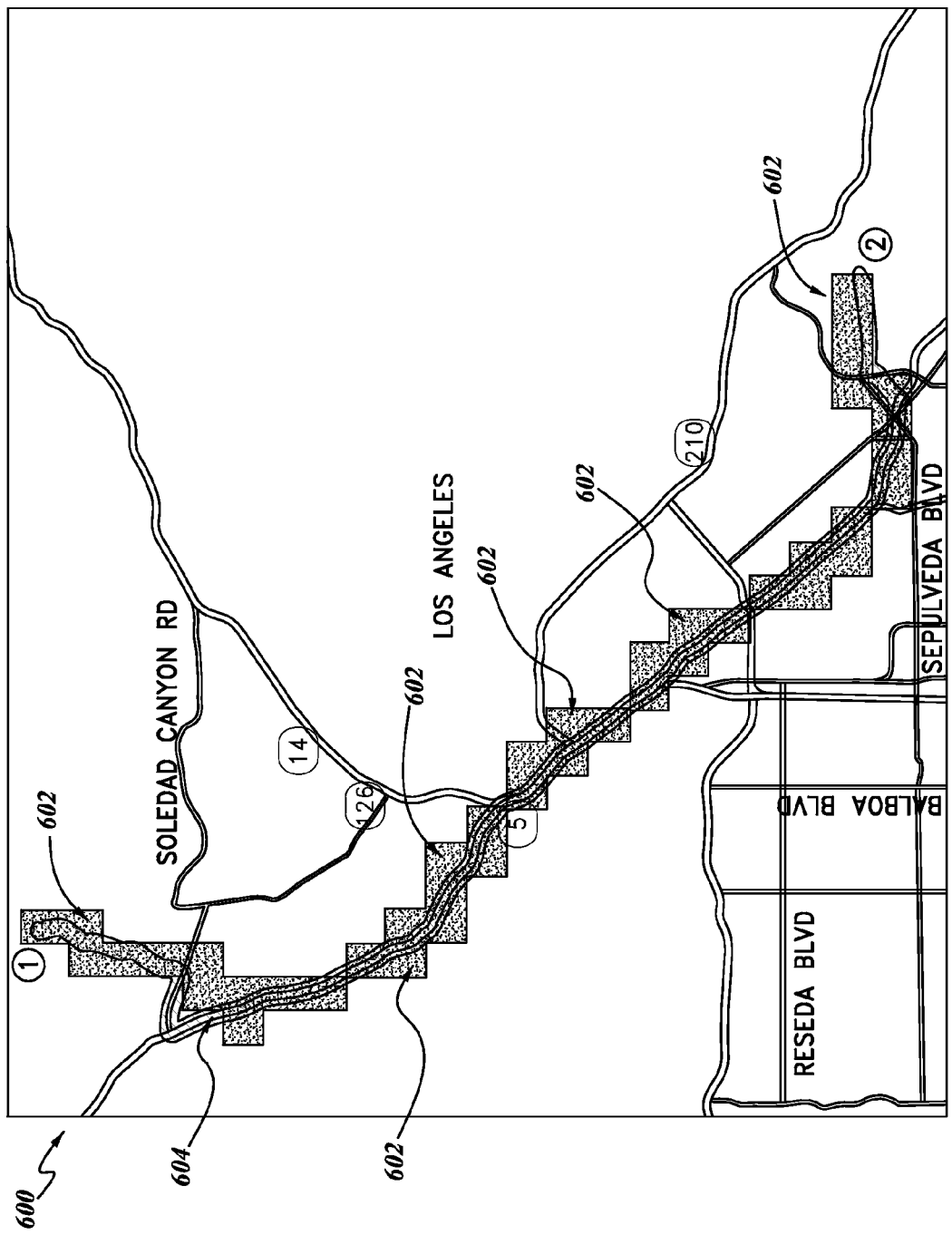
FIG. 6
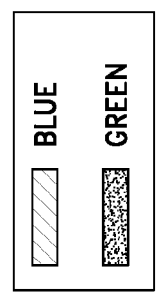

VEHICLE FLEET ROUTING SYSTEM

RELATED APPLICATION

This application claims the benefit of priority under 35 U.S.C. §119(e) to U.S. Provisional Patent Application No. 61/596,538, filed on Feb. 8, 2012, entitled "VEHICLE FLEET ROUTING SYSTEM," which is hereby incorporated by reference in its entirety.

BACKGROUND

Route selection or optimization has applications in vehicle routing, printed wire circuit layout, chip design and layout, and biological activities. Trucking and other vehicle fleets, for instance, select vehicle routes to deliver goods to various destinations. Similarly, transportation companies route vehicles to pick up and drop off passengers. In addition to land-based vehicles, route selection can also be used for ship, airplane, and rail transport route scheduling.

A typical route selection problem is to reduce or minimize the distance traveled or time spent traveling. Route selection problems might consider such factors as a number of turns in a given route, a number of intersections, speed limits, bridge crossings, and the like. Algorithms modeled using concepts from graph theory are often used to select routes.

SUMMARY

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

In certain embodiments, a system for calculating a route for a vehicle includes a routing module comprising computer hardware. The routing module can receive an indication of a start node and an end node of a route to be traveled by a vehicle. The routing module can route a first route from the start node toward the end node until identifying a first groove node using a first routing network. In some cases, the first groove node is not the end node. The routing module can also route a second route from the end node toward the start node until identifying a second groove node using the first routing network, where the second groove node is not the start node. Further, the routing module can identify a groove route from the first groove node to the second groove node using a second routing network to produce an initial route comprising the first route, the groove route, and the second route. The second routing network can include a subset of nodes of the first routing network. Moreover, the routing module can refine the initial route, using the first routing network, to produce an output route by evaluating the groove route to identify an alternative route to at least a portion of the groove route based at least in part on distance from the groove route and one or more routing factors.

In certain embodiments, a system for calculating routes for a plurality of vehicles in a vehicle fleet can include a street classification module comprising computer hardware. The street classification module can assign values to streets of a network of streets in a geographic region for the purpose of efficiently determining how to route a plurality of vehicles in a vehicle fleet. The values can be indicative of positions of the streets relative to other streets at intersections of the streets. The street classification module can also store the assigned values in a computer database. The system may also include a route calculation module that can calculate a first route on the network of streets in the geographic region for a first vehicle of the plurality of vehicles in the vehicle fleet using the assigned values stored in the computer database to penalize or favor certain directions of travel over other directions of travel at the intersections. The route calculation module can also output the first route to a navigation device associated with the first vehicle for presentation to a driver of the first vehicle.

BRIEF DESCRIPTION OF THE DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

FIG. 3 illustrates an example map with superimposed groove route networks.

FIGS. 6 through 9 illustrate maps with additional example groove routing scenarios.

DESCRIPTION OF EMBODIMENTS

I. Overview

A vehicle management system is described herein that can perform a variety of features related to managing fleets of vehicles. For example, the vehicle management system includes a routing module that can perform a variety of functions. Some of these functions can include determining a first route between locations using a simplified routing network and then determining a second route between the locations using a more exhaustive routing network. Further, the routing module can store information about the natural flow through intersections, improving control of routes through intersections. Some or all of these features may be used together, or any of these features may be omitted in any given embodiment.

It should be understood that terms used herein such as "optimize," "minimize," "maximize," and the like may, in addition to having their ordinary meaning, denote processes that attempt to optimize, minimize, or maximize one or more parameters or processes while potentially not fully optimizing, minimizing, or maximizing the parameters or processes. For instance, although a parameter or process may be referred to as being "optimized" herein, the parameter or process may be improved over some prior state and not reach an optimal solution. Similarly, a quantity that is "minimized" or "maximized" may be reduced or increased less than a fully minimal or maximal amount, respectively.

II. Example Vehicle Management System

Figure 1:
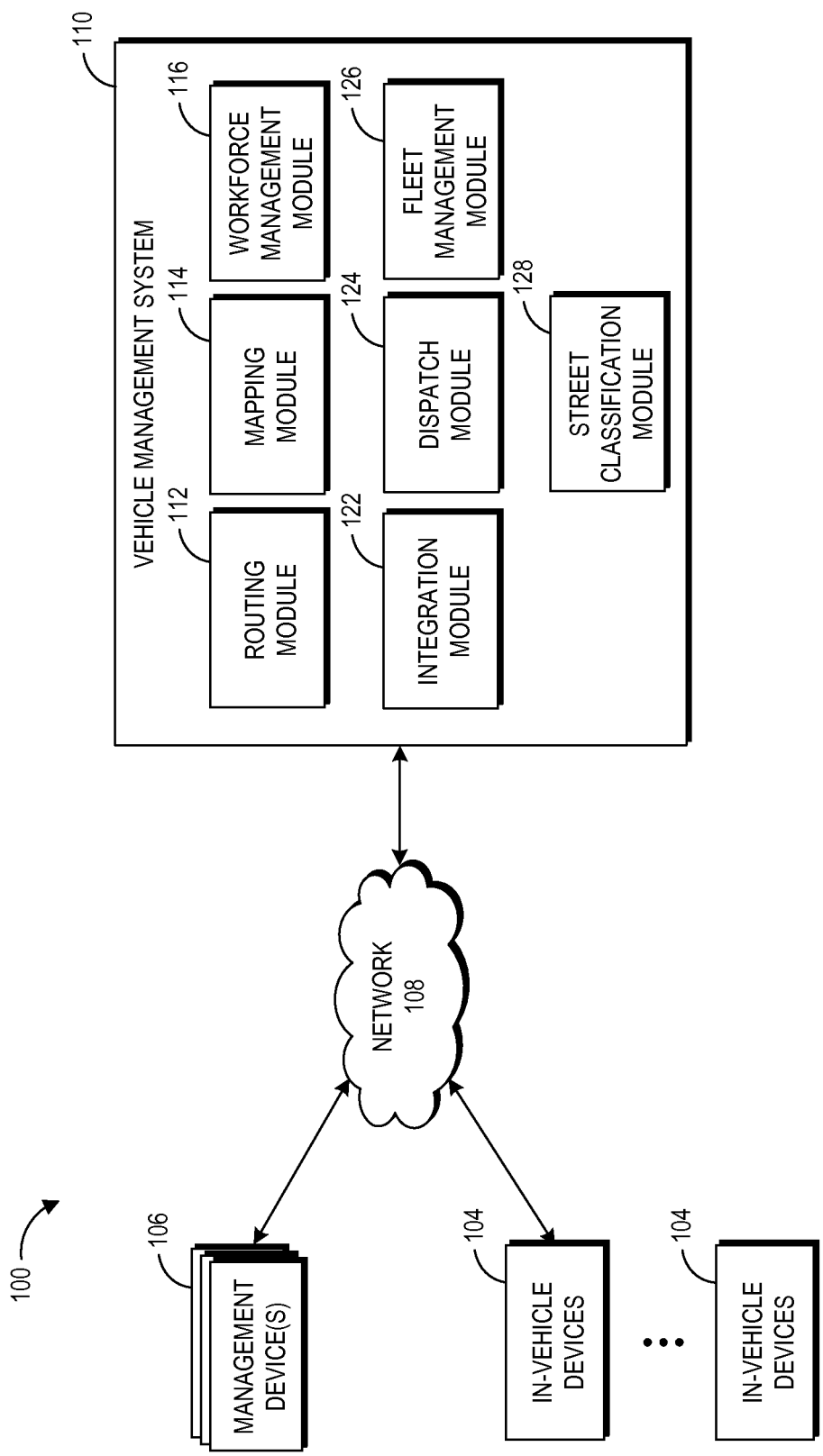
FIG. 1 illustrates an embodiment of a vehicle management system.

FIG. 1 illustrates an embodiment of a computing environment 100 for implementing crowdsourcing analytics using a vehicle management system 110. Among other features, the example vehicle management system 110 shown includes three crowdsourcing modules (132-136) that can analyze vehicle and/or driver data to provide vehicle diagnostics, road health information, and driver health information. Prior to describing the functionality of these crowdsourcing modules, the computing environment 100 and other aspects of the vehicle management system 110 will be described in detail.

In the computing environment 100, one or more in-vehicle devices 104 and management devices 140 communicate with the vehicle management system 110 over a network 108. The in-vehicle devices 104 can include computing devices installed in fleet vehicles. These devices 104 can include navigation functionality, routing functionality, and the like. The in-vehicle devices 104 can receive route information and other information from the vehicle management system 110. In addition, the in-vehicle devices 104 can report information to the vehicle management system 110, such as driver location, vehicle sensor data, vehicle status (e.g., maintenance, tire pressure, or the like), and so forth.

The illustrated network 108 may be a LAN, a WAN, the Internet, combinations of the same, or the like. For ease of illustration, the vehicle management system 110 has been depicted as a centralized system or platform. However, in other implementations, at least some of the functionality of the vehicle management system 110 is implemented in other devices or in multiple servers or data centers. For example, the vehicle management system 110 can be implemented as software as a service (SaaS) in the cloud and may be located in multiple data centers around the world (or portion thereof). Other possible implementations of the vehicle management system 110 can include many more or fewer components than those shown in FIG. 1.

The management devices 140 can be computing devices used by dispatchers, fleet managers, administrators, or other users to manage different aspects of the vehicle management system 110. For example, a user of a management device 140 can access the vehicle management system 110 to generate routes, dispatch vehicles and drivers, and perform other individual vehicle or fleet management functions. With the management devices 140, users can access and monitor vehicle information obtained from one or more of the in-vehicle devices 104 by the vehicle management system 110. Such vehicle status information can include data on vehicle routes used, stops, speed, vehicle feature usage (such as power take-off device usage), driver behavior and performance, vehicle emissions, vehicle maintenance, energy usage, and the like. In some embodiments, the management devices 140 are in fixed locations, such as at a dispatch center. The management devices 140 can also be used by administrators in the field, and may include mobile devices, laptops, tablets, smartphones, personal digital assistants (PDAs), desktops, or the like.

The vehicle management system 110 can be implemented by one or more physical computing devices, such as servers. These servers can be physically co-located or can be geographically separate, for example, in different data centers. In one embodiment, the vehicle management system 110 is implemented as a cloud computing application. For instance, the vehicle management system 110 can be a cloud-implemented platform hosted in one or more virtual servers and/or physical servers accessible to users over the Internet or other network 108. In the depicted embodiment, the vehicle management system 110 includes a fleet management module 126, a mapping module 114, a telematics module (not shown), a routing module 112, a dispatch module 124, and an integration module 122. These components can, but need not, be integrated together on a common software or hardware platform.

The fleet management module 126 can include functionality for generating, rendering, or otherwise displaying one or more vehicle management user interfaces. The vehicle management user interfaces can include a map or list of vehicles that depicts symbols or other data representative of vehicles. In addition, the vehicle management user interfaces can optionally include a history timeline display. For example, in response to user selection of one or more of the vehicle symbols from the map or list, the vehicle management user interface can output one or more vehicle history timelines corresponding to the selected vehicle or vehicles. Although the fleet management module 126 generates the user interface, in certain embodiments the fleet management module 126 outputs the user interface to the management devices 140, which actually display the user interface and associated history timeline display 116. Thus, as used herein, the terms "output a user interface for presentation to a user," "presenting a user interface to a user," and the like, in addition to having their ordinary meaning, can also mean (among other things) transmitting user interface information over a network, such that a user device can actually display the user interface.

The fleet management module 126 can communicate with the mapping module 114 to obtain mapping data, which the fleet management module 126 can include in the vehicle management user interface. The mapping data can be compressed, transmitted, re-rendered, and displayed on the management user interface. Other data can also be overlaid to enhance the map and management layout. The mapping module 114 can be a geographic information system (GIS) in one embodiment. The fleet management module 126 can also access a telematics module (not shown) to obtain vehicle status data for inclusion in vehicle history displays. The telematics module can provide this vehicle status data based on telematics data obtained from the in-vehicle devices 104. The telematics data can include such data as location or speed information obtained using GPS or cellular tower triangulation (or other methods), vehicle sensor data, solid state inertial information, or any other data that can be obtained from a vehicle, its engine, or the like (including other sensors such as passenger seat sensors to detect the presence of passengers and so forth).

The routing module 112 can construct pre-dispatch or post-dispatch routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. In addition, the routing module 110 can automatically select routes that take into account factors that affect energy usage using the techniques described in U.S. application Ser. No. 12/954,547, filed Nov. 24, 2010, and entitled "Vehicle Route Selection Based on Energy Usage," the disclosure of which is hereby incorporated by reference in its entirety.

The integration module 122 can facilitate integration of the vehicle management system 110 with other systems, such as fuel card systems, payroll systems, supply chain system, insurance systems, and the like. The dispatch module 124 can provide functionality for users of the management devices 140 to assign drivers and vehicles to routes selected by the routing module 112.

In certain embodiments, groove routing can be a system or method of influencing a routing algorithm so that it can spend less time evaluating links that are less likely to be on a route between stops. Groove routing can result in faster, more efficient routing computation and produce more accurate routes.

III. Example Groove Routing Embodiments

By way of overview, the routing module 112 can run full or partial routing calculations multiple times to improve a route between two locations. In calculating a first route or groove, a groove network can be used, where a groove network can be a simplified version of a routing network. The groove network can enable quick and efficient determination of the groove. The routing module 112 can then use information about the groove to influence a second or subsequent route determination. Because the routing module 112 can have information about the expected general route based on the groove, the routing module 112 can, for example, prioritize, limit, and/or steer the calculations for developing the subsequent route.

In some embodiments, the second or subsequent route determination can involve processing different and/or a more exhaustive routing network than the groove network. The more exhaustive routing network can include additional information not contained in the groove network and/or additional constraints, such as traffic data or custom routing functions (e.g., no left turns in certain areas by particular vehicles). Under one approach, a route determination utilizing the more exhaustive routing network can result in longer processing times to determine a given route. However, the routing module 112 can take the expected general route information from processing the groove to help control the determination of the second or subsequent route. The routing module 112 can use distance from the groove or functional classification of street links (e.g., street link classification as discussed below or NAVTEQ™'s road classification) relative to the groove, among other possibilities, to prioritize, limit, and/or steer the calculations that may otherwise lead the second or subsequent route determination away from the groove. In other embodiments, the groove and the second or subsequent route can be determined by different components, such as the routing module 112, management device(s) 106, and/or in-vehicle devices 104 of FIG. 1 discussed above. For example, the groove can be determined by the routing module 112 while the second or subsequent route can be determined by the management device(s) 106 or in-vehicle devices 104, or vice versa.

The routing module 112 can determine a final advised route using various combinations of the groove, one or more subsequent routes based on the groove, or other route determinations. In some embodiments, the routing module 112 can use a non-groove based route determination when a vehicle may be close to a starting point or destination and then a groove-based determination at other times. For example, such an approach can permit the evaluation of more minor streets as the vehicle may be closer to the starting point or destination while excluding such streets when the streets may be less likely to be important. In other embodiments, the routing module 112 can rely on a groove-based approach for calculation of the entire route.

Figure 2:
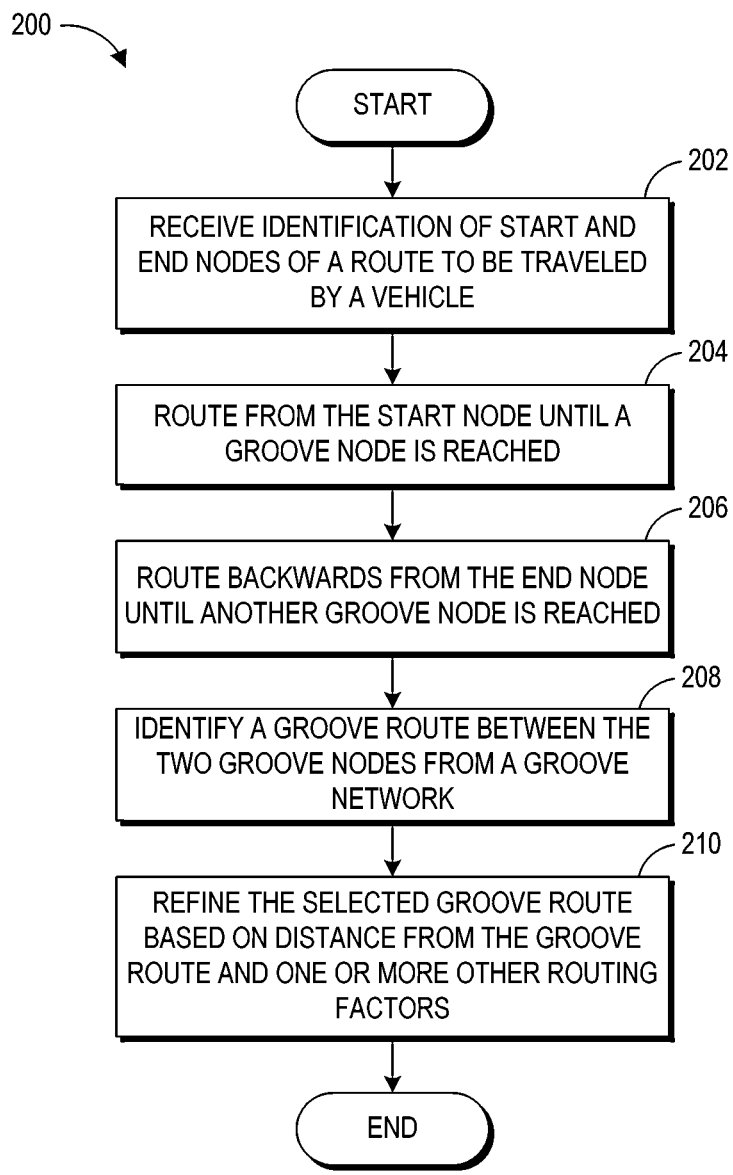
FIG. 2 illustrates an embodiment of a groove routing process.

Referring to FIG. 2, an example groove routing process 200 is shown. The groove routing process 200 can be implemented by the vehicle management system 110, and in particular, by the routing module 112. Advantageously, in certain embodiments, the groove routing process 200 can facilitate more rapid identification of a route for a vehicle.

At block 202, the routing module 112 receives an identification of start and end nodes of a route to be traveled by a vehicle. A user, such as a dispatcher, driver, or fleet manager can input start and end addresses, for example, into a user device in communication with the routing module 112. These addresses are examples of nodes. Other examples of nodes described herein are intersections. In addition, nodes can include any geographic location in some embodiments.

The routing module 112 routes from the start node until a groove node is reached at block 204. For instance, the routing module 112 can route in a full routing network, which may include data about every road link in a geographic area, to initially route from the start node until the groove node is reached. Once the groove node is reached, the routing module 112 can continue by routing in a groove network, as described below. In addition, in an embodiment, the routing module 112 routes bidirectionally at block 206 by routing backwards from the end node in the full road network until another groove node is reached.

With the two groove nodes identified, the routing module 112 can identify a groove route between the two groove nodes from a groove network in block 208. The routing module 112 can select the appropriate groove network to access based on the crow-fly distance or Euclidean distance (or some other measure of distance) between the start node and the end node in one embodiment. Using this distance, the routing module 112 can select a groove routing network that includes grooves smaller than the identified distance. There may be several (e.g., two, three, or more) groove networks in some embodiments that can be represented by different data sets, which abstract the full road network at different levels of abstraction. A top, or most abstract, level of the groove network can include the largest groove links between the groove nodes in the groove route network, representing, for example, primarily highways and major roads. In contrast, a lower level groove route network may include more surface streets in the groove route network. Many variations are possible, including variations that include just a single groove route network, or a plurality of groove route networks stored within a single data set.

At block 210, the routing module 112 refines the selected groove route based on distance from the groove route and one or more other routing factors. More generally, the routing module 112 can refine the route from the starting node to the groove node, to the groove route, to the end node based on the distance from the groove route and one or more routing factors. In one embodiment, the routing module 112 may select alternative road links from the road links included in the groove route based on various routing factors such as weather, traffic, fuel efficiency, construction, overpass height, and street link classification. Weather, traffic, or construction on the groove route may cause delays that could be mitigated by routing around the groove route. Weather and traffic information for routing purposes can be accessed as described in U.S. patent application Ser. No. 13/163,630, filed Jun. 17, 2011, titled "System and Method for Efficient Routing on Network in the Presence of Multiple Edge Restrictions and Other Constraints," the disclosure of which is hereby incorporated by reference in its entirety.

Similarly, the routing module 112 can take fuel efficiency factors into account when refining the groove route. The groove route may take a vehicle over a steep grade, whereas a nearby route that has a slightly longer distance may be over a much flatter route, potentially saving fuel costs. Accordingly, the routing module 112 can take fuel efficiency into consideration, using, for example, any of the techniques described in U.S. patent application Ser. No. 12/954,547, filed Nov. 24, 2010, titled "Vehicle Route Selection Based on Energy Usage," the disclosure of which is hereby incorporated by reference in its entirety.

Overpass height in the groove route may be too low for some vehicles. Thus, the routing module 112 can take this factor into consideration when refining the groove route, to route around any overpasses that are too low.

When evaluating the road links around the groove route, the routing module 112 can downweight or deemphasize links around the groove route the farther these road links are away from the groove route. Said another way, the closer a new route is to the groove route, the more emphasized these new routes may be in some embodiments. For instance, in some embodiments, the geographic area being routed over can be divided into quads, or boxes, which are of a certain dimension (such as 1 km by 1 km, although square dimensions are not required). The closer a quad is to the groove route, the higher weight the routing module 112 may give to it. For road links in quads that are further from the groove route, the routing module 112 can deemphasize these road links as alternatives for refining the groove route.

Further, the routing module 112 can select alternative road links around a groove based on street link classification. Street link classification can include classifications or scores indicative of a hierarchical ranking, degree of importance, or suitability of streets for routing fleet vehicles. Street classifications may highly score streets that are larger thoroughfares, such as highways, than smaller or slower roads, such as surface streets. Street link classification is described in detail in U.S. patent application Ser. No. 13/587,705, filed Aug. 16, 2012, titled "System for Classifying Streets for Vehicle Navigation," the disclosure of which is hereby incorporated by reference in its entirety. The routing module 112 can use any of the features of the '705 application to refine the groove route, for example, by picking highways to route around the groove route over surface streets in some embodiments. The routing module 112 can also use existing products that rank streets, such as may be commercially available from NAVTEQ™, rather than or in addition to the street link classifications described in the '705 application.

It should be noted that the routing factors considered when refining the groove route may not be considered when the routing module 112 initially selects the groove route. Rather, the routing module 112 can quickly identify a rough route using the groove route and then refine the groove route. Identifying the groove route first can greatly reduce the search space in the full routing network, resulting in significantly faster route identification in some embodiments. It should also be noted that although a single start and end point are described in many examples herein that an actual route may include many end points (such as for a delivery truck). However, the principles described herein can be extended to multiple stops or end points in a route by repeating the process 200 between each set of two end points in some embodiments. Further, other factors that the routing module 112 may consider when refining routes can include any of the features, characteristics, or attributes of routing algorithms described in U.S. Patent Application No. 61/682,150, filed Aug. 10, 2012, titled "Real-Time Computation of Vehicle Service Routes," the disclosure of which is hereby incorporated by reference in its entirety. Moreover, the routing module 112 can use any of the routing functionality described in U.S. patent application Ser. No. 13/648,243, filed Oct. 9, 2012, titled "Vehicle Fleet Routing System," the disclosure of which is hereby incorporated by reference in its entirety.

FIG. 3 illustrates an example map 300 with superimposed groove route networks. In the map 300, the top, most simplified, groove network level is black. Next is green, then blue. The bottom, most detailed groove network level is red.

To create the groove route, in certain embodiments, the routing module 112 can start routing forwards along the standard street network from the start of the route and at the same time can route backwards from the end of the route (see, e.g., FIG. 2). When the frontiers of the route have a travel time of 10 minutes in one example embodiment, the routing module 112 can stop routing along the standard street network and can continue routing along the lowest level of the groove network (red in the picture above). When the frontiers have reached a travel time of 30 minutes, the routing module 112 can stop routing along the lowest level of the groove network and can continue routing along the next, more simplified, level of the groove network (blue). The routing module 112 can continue moving up the groove network at 90 and 270 minute travel times, at which point the routing module 112 can be on the fourth and final level (black) and can stay at that level until a route can be found. A route can be found when the two directions of the route meet. The times described herein are merely examples and can be varied in other embodiments. Further, the example levels of the groove networks shown are merely examples, and more or fewer levels can be provided in other embodiments.

Figure 4:
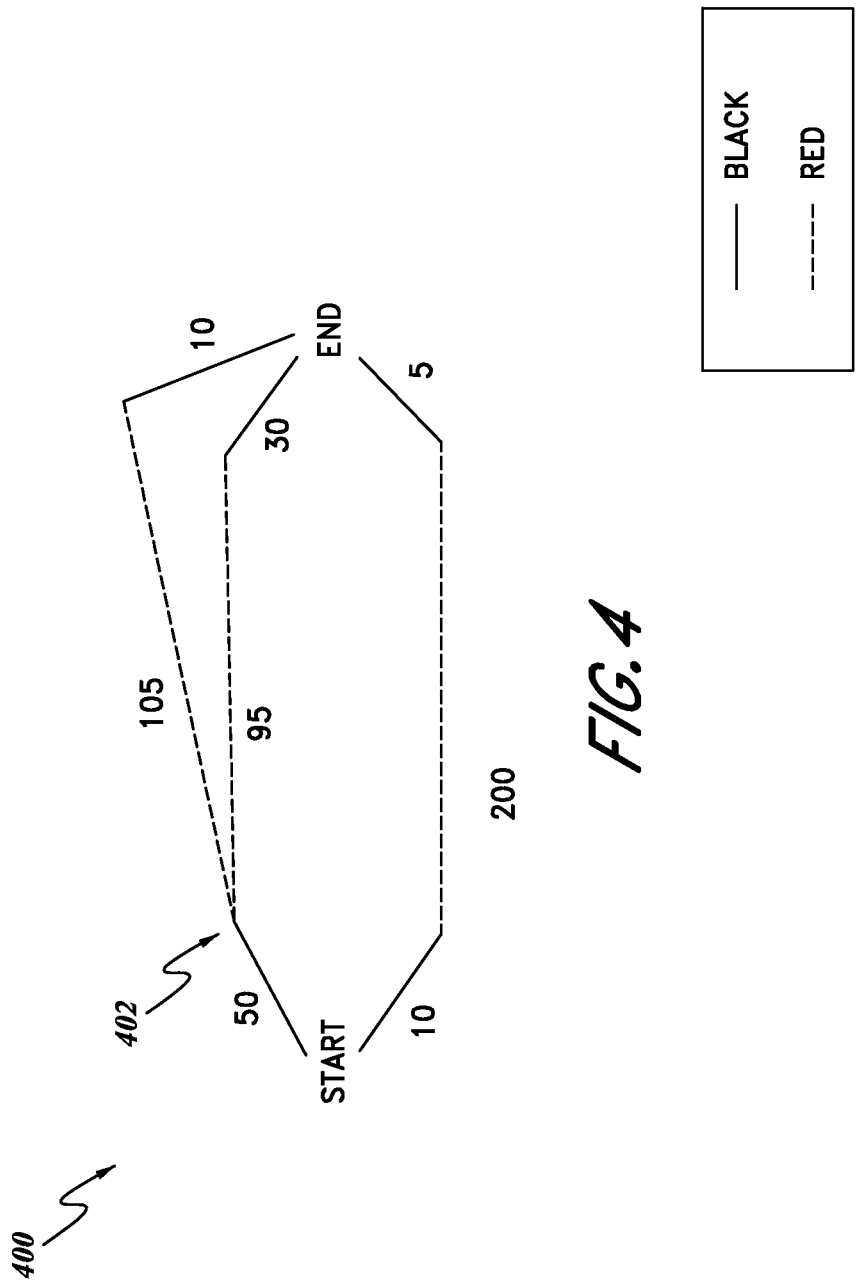
FIG. 4 illustrates a graph of an example groove routing scenario.

FIG. 4 illustrates a graph 400 of an example groove routing scenario. When routing, the scheme can be to quickly produce a groove route or groove, which can indicate a likely best route to the destination, and then that groove can be used to control the order in which intersections can be evaluated, so that the routing module 112 can evaluate as few intersections as possible.

Producing a good groove quickly can be beneficial in certain embodiments. To do so, the routing module 112 can use a groove network, which can be a simplified version of the full routing network. When finding the groove, the routing module 112 can use the full routing network to get onto the groove network, then can use the groove network to get close to the destination, and then can use the full routing network to get to the destination.

Once the routing module 112 has created a groove, the routing module 112 can re-run the route without using the groove network. The groove that the routing module 112 found earlier can be used to steer the new route, so that the routing module 112 can evaluate fewer connections or nodes in the full routing network. Re-running with the full network can allow taking constraints like traffic and routing profiles into account.

In FIG. 4, where red is the groove network and black is the full network, the groove route with lowest cost can go through the groove node 402 with cost 50. There are two issues to consider. Issue one: how can the routing module 112 know to route to the groove node with cost 50 even though the routing module 112 found a groove node with cost 10? As the routing module 112 may not want to explore the full routing network much, there can be a groove node that can be a little farther away from the start that can get us to the destination quicker. Issue two: how can the routing module 112 know to take the groove link with cost 105 when there can be a groove link with cost 95? The cost from the 95 link to the end can be very high, in which case the routing module 112 may not want to waste time exploring the full network near the end.

If the routing module 112 can solve issue 1 then issue 2 can be solved by routing bi-directionally, as the two issues can be mirrors of each other. The routing module 112 can solve issue 1 by building an appropriate groove network.

Figure 5:
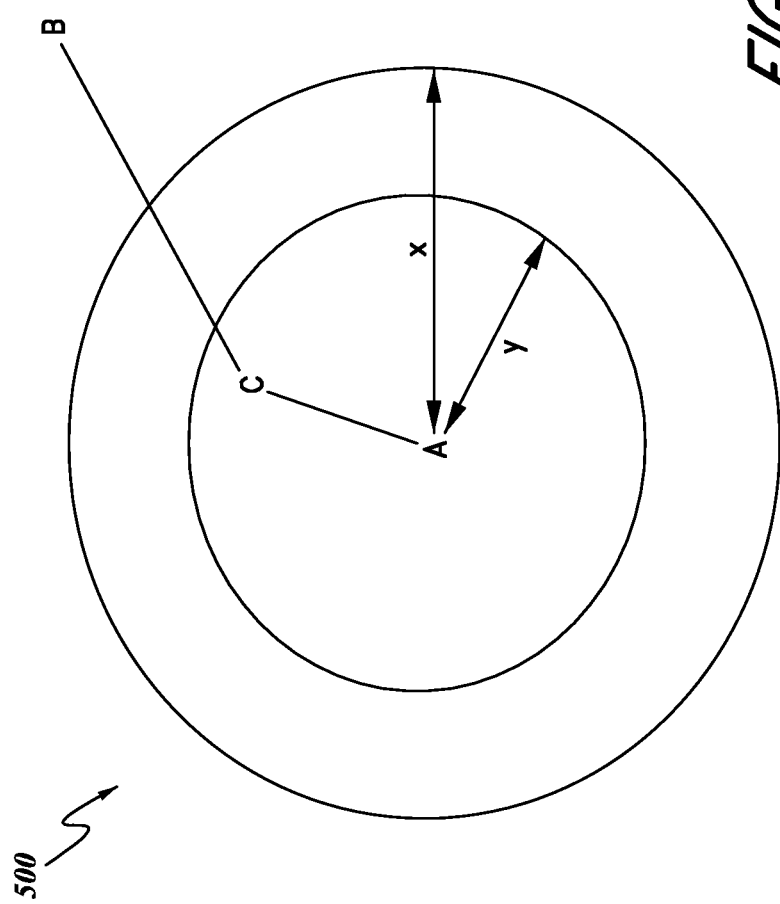
FIG. 5 illustrates another graph of an example groove routing scenario.

FIG. 5 illustrates an example groove network scenario 500 that facilitates explaining how groove networks can be constructed in some embodiments. An appropriate network can go as follows in one example embodiment. For each node A in the full network, for every node B that can be more than cost x away, there can be a groove node C that can be less than cost y away, where x>y. The parameters x and y can be chosen in certain embodiments to provide a different level of groove network, with larger values of x and y providing a higher abstract level of a groove network and lower parameters of x and y providing a more granular level of a groove network.

If the cost of a route from the start A to the end E is greater than 2x, then the best route can go through at least two groove nodes. If the full routing network is explored to cost y, then the routing module 112 can know that it found the groove nodes.

If the cost of the route is 2x or less, then the routing module 112 may not use the groove network as there can be a better route that may not use any groove nodes. If the crow-flies distance between A and E is greater than 2x*max_speed, where max_speed can be the maximum speed in the routing profile, then the routing module 112 can route bi-directionally along the full network to cost y and then can route along the groove network. If the crow-flies distance is less than that, then the routing module 112 can route bi-directionally along the full network to cost x. If a route is not found, then the routing module 112 can route along the groove network between groove nodes with a cost below x.

Identifying Groove Nodes

For each node A in the full network, a non-directed route can be run in one embodiment until either everything in a heap data structure has a cost greater than y or until everything in the heap has a groove node in its routing history. In the latter case, there may be no more to be done as the groove network condition for A may be satisfied. Otherwise, the history of everything in the heap can be gone through and, for each history, can make the first node with a cost less than y a groove node.

Creating Groove Links

The shortest paths from some or all nodes to some or all other nodes can contain a groove node within cost y of the start. So to create all the groove links, the routing module 112 can run a non-directed route from each groove node A until everything in the heap can have a cost greater than y. Links can be added from A to each groove node that can be removed from the heap.

In some embodiments, this may be the case if, when identifying the groove nodes, the routing module 112 can ignore the start node when working out whether a route history already contains a groove node.

If the groove network is too dense for efficient routing, then the routing module 112 can lay a network on top of the first groove network and can use larger values for x and y. This process can be repeated more than one time to create multiple levels of groove networks (or to select a single appropriate level groove network).

Choosing x and y

The groove network distance parameters x and y can be tuned. Larger values of x can produce simpler groove networks, but can mean that more routes can have a cost less than 2x, in which case the full network can be explored more at runtime. Larger values of y can also produce simpler groove networks, but can mean that for some or all routes the routing module 112 may want to explore the full network further.

In the example map 600 of FIG. 6, quads 602 that are part of a groove 604 are shown. The groove 604 can be used to steer the main routing algorithm, so that the routing module 112 can spend less time evaluating links that may be less likely to be on the route between the route stops. The groove 604 can be quick to produce as it can use a specially simplified street network. The resulting groove 604 can have a granularity of 1 base quad, which can be approximately 1 km×1 km, in some embodiments.

Figure 7:
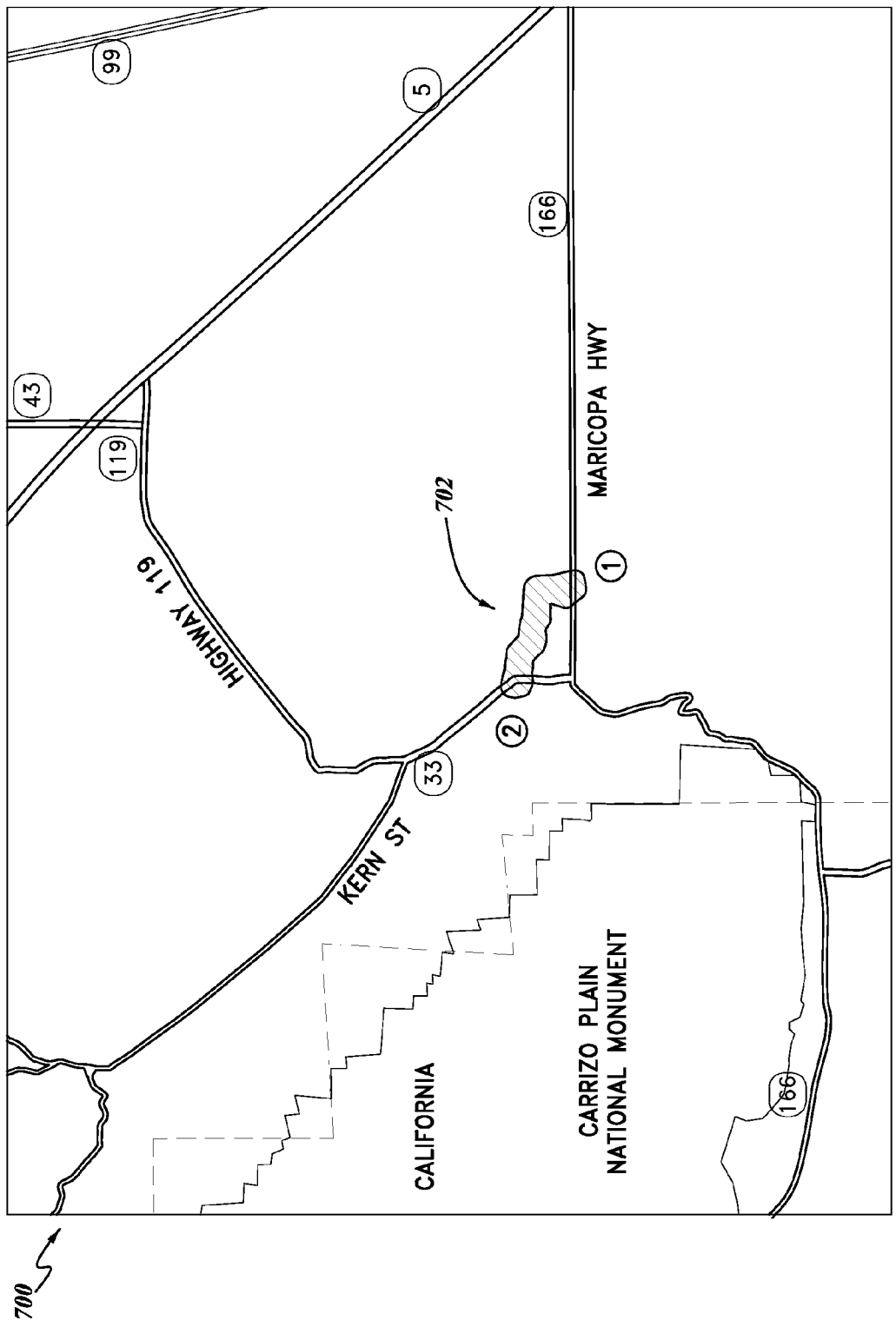
Figure 8:
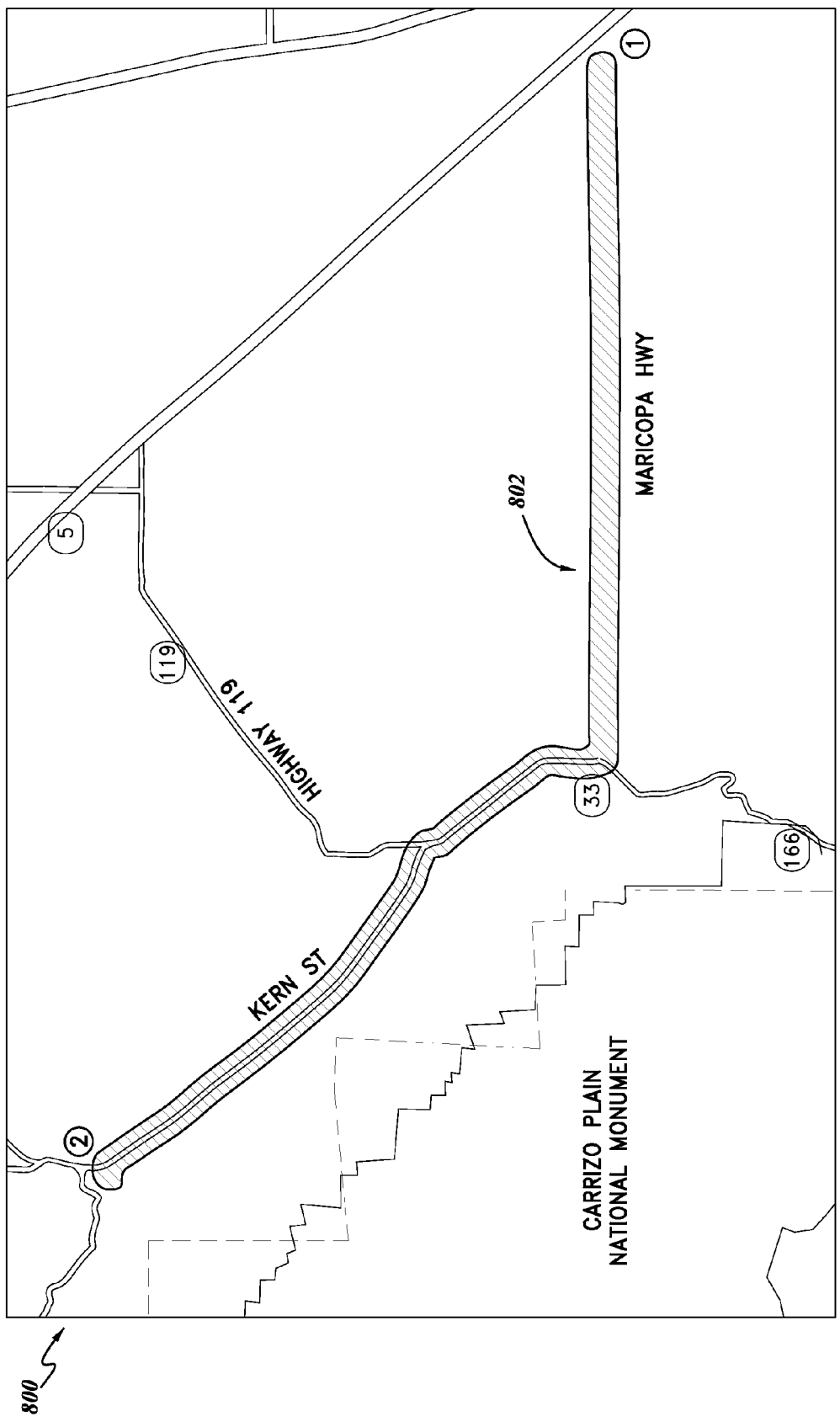

After creating the groove 604, the routing module 112 can run the full unidirectional routing algorithm, which can be able to take constraints, traffic, custom routing functions and so on into account, as described above. The algorithm can be able to diverge from the groove 604 if these other factors indicate that there may be a better route. In some embodiments, in cases other than short routes, the algorithm also can diverge from the groove 604 when it may prefer to stay on a highway rather than take a shortcut along lower class streets. This can reduce the complexity of the routes that the routing module 112 can produce, and can reflect how people travel. For instance, in the example maps 700 of FIG. 7, a shortcut 702 avoiding the centre of Maricopa can be taken when the route may be relatively short. But for a longer route 802, as in the map 800 of FIG. 8, the routing module 112 can prefer the highways and can go through the town center.

Figure 9:
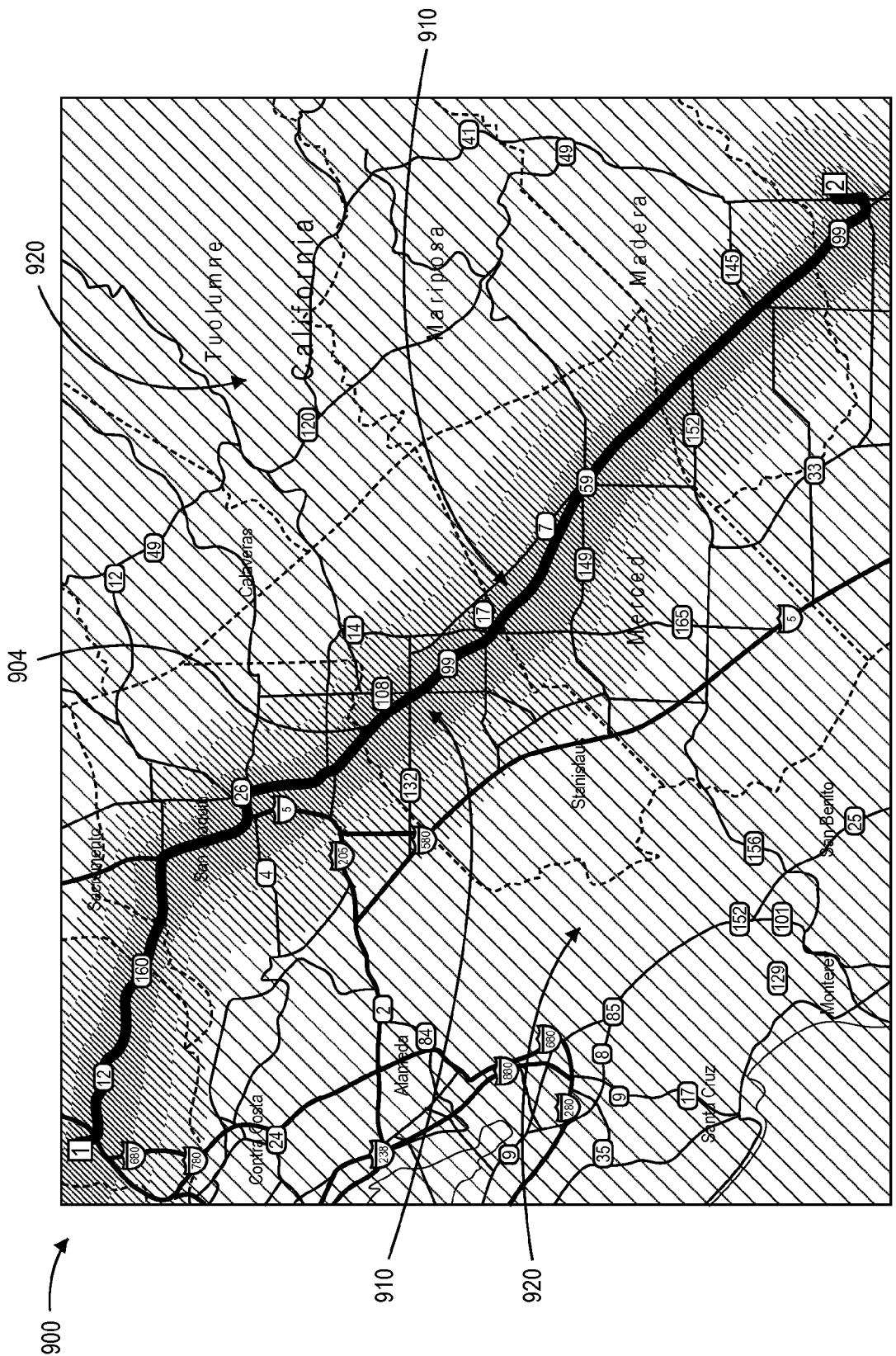

In FIG. 9, an example heat map 900 is shown that illustrates an example groove 904 for functional class 2 links (according to an example street link classification; see FIG. 2 above). Links in a green zone 910 around the groove 904 can be evaluated preferentially to those in a red zone 920 farther from the groove. Different functional classes of streets can have different heat maps. For example, the green zone for functional class 5 links (e.g., surface streets) can be narrower than the green zone for a higher class link (such as a highway).

Thus, in certain embodiments, heat maps (or their data structure equivalents) may be used by the routing module 112 instead of quads to refine routing around a groove.

Figure 10:
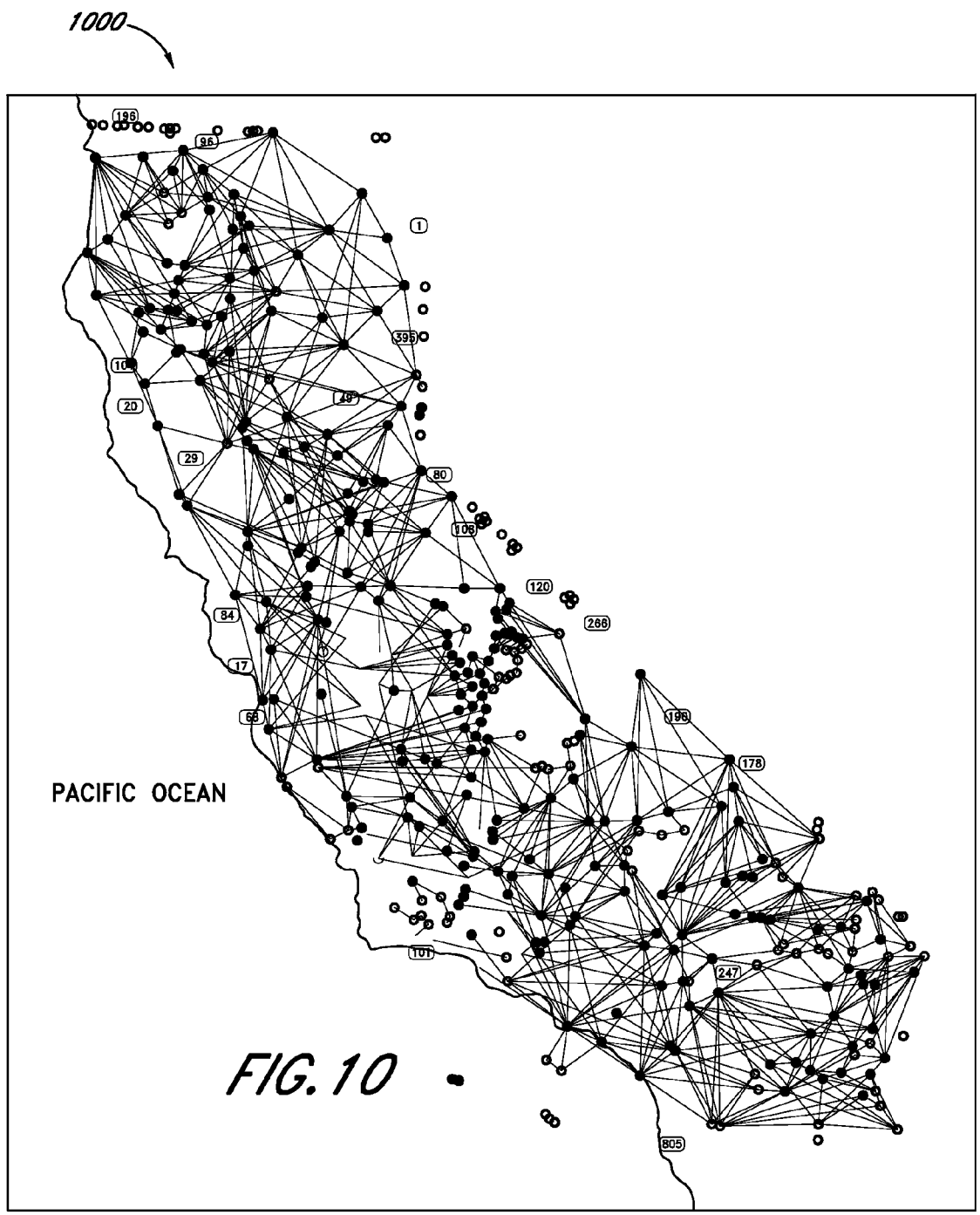
FIG. 10 illustrate a map with an example groove routing network.

FIG. 10 illustrates an example top level of the groove network for California.

Figure 11:
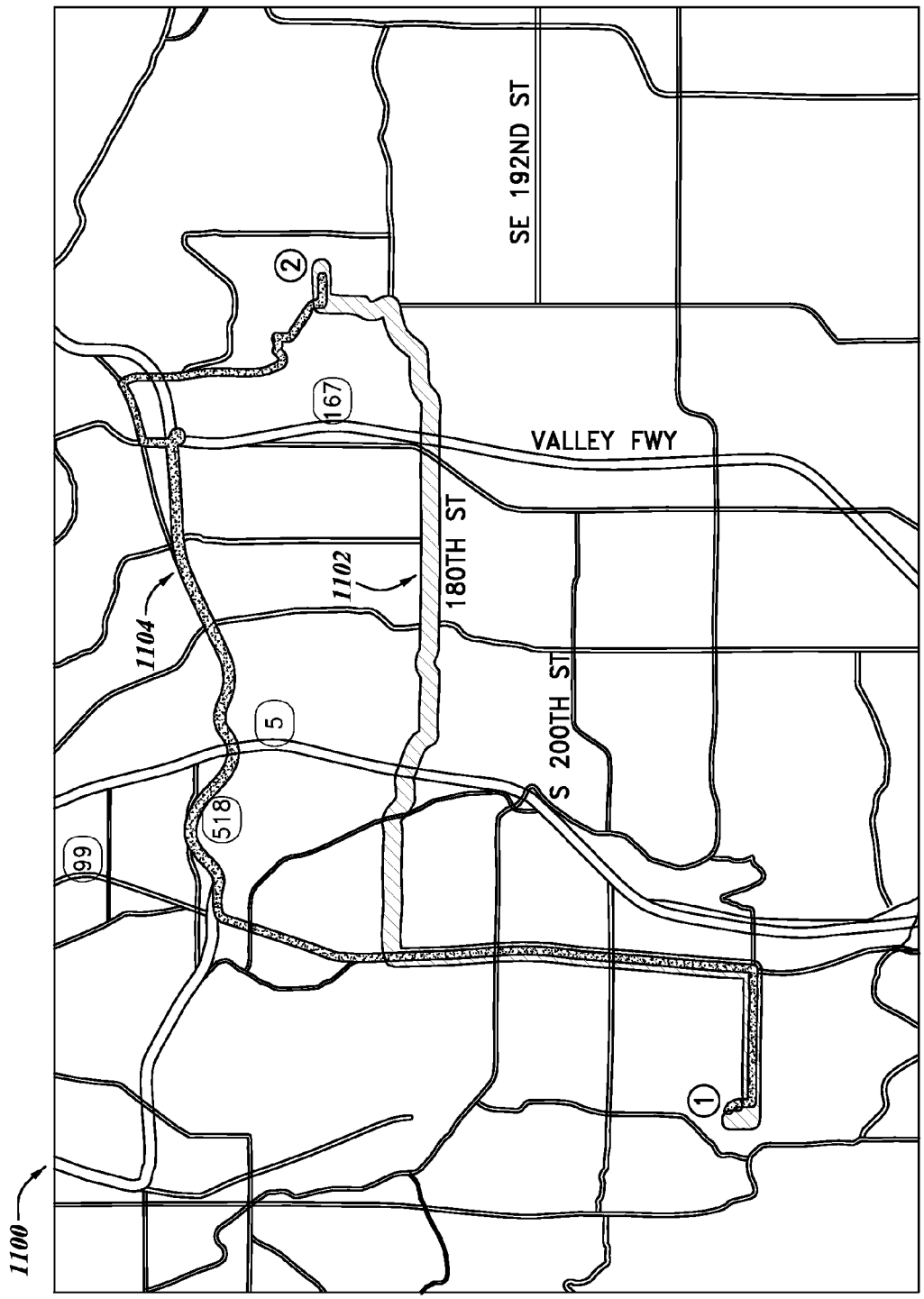
FIGS. 11 and 12 illustrate maps with example route comparisons.
Figure 12:
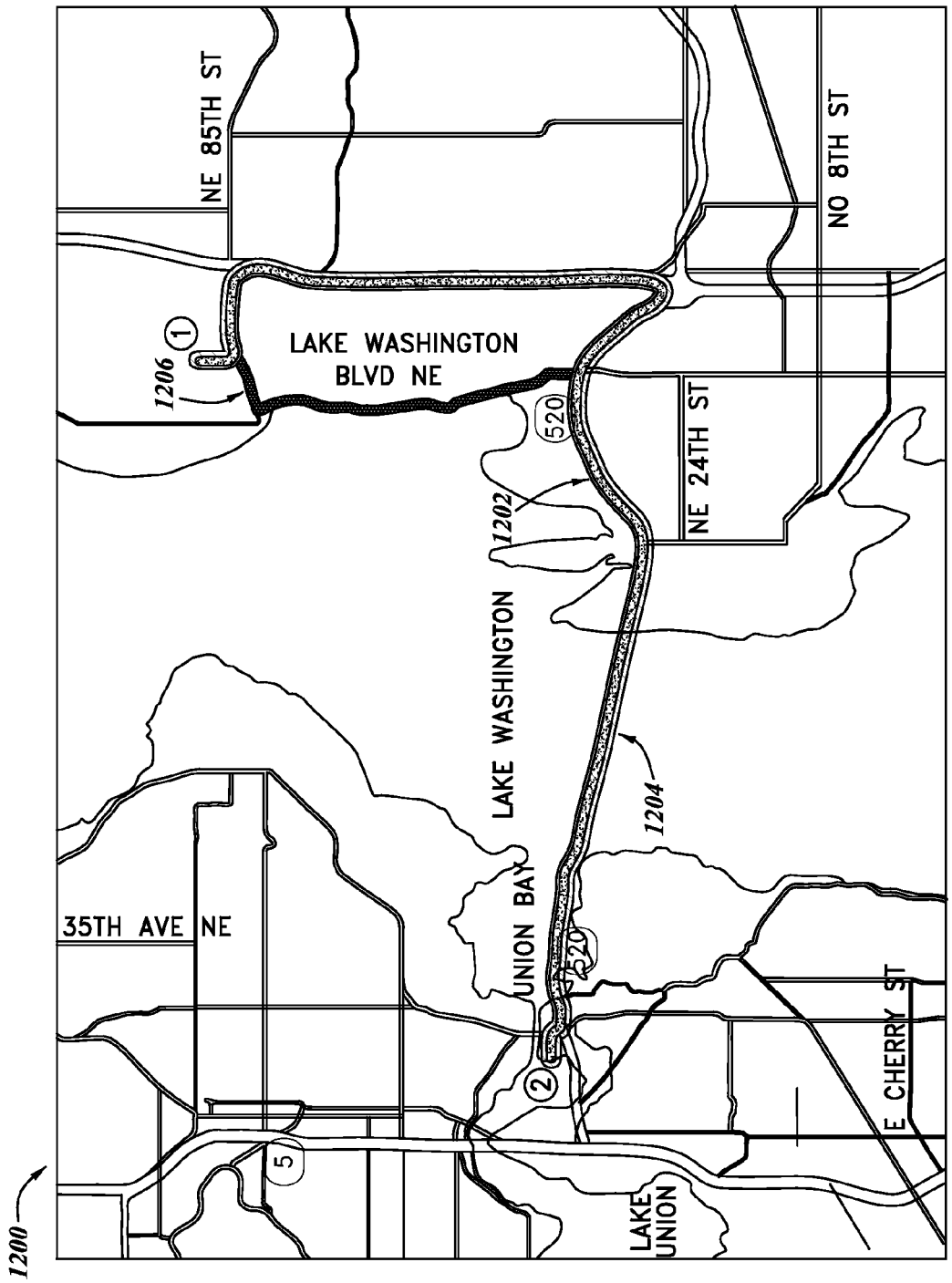

In certain embodiments, the routing module 112 can output a route comparison display. Examples of route comparison displays 1100, 1200 are shown in FIGS. 11 and 12. The route comparison displays 1100, 1200 can assist the development process. In the example display 1100 of FIG. 11, a quad-generated\route 1102 is in blue and a route 1104 generated using Google™ technology is in red. In the example display 1200 of FIG. 12, another comparison is shown, this time between a quad-generated route 1202 (blue), a Google™-generated route 1204 (red) and a route 1206 generated with the GB3.0 program (yellow).

IV. Natural Flow

The routing module 112 can utilize information about the flow through intersections to improve control of routes through intersections. The flow can be determined relative to a default direction of travel or "natural flow" through an intersection for one or more links of intersections and stored for use in routing calculations by the routing module 112. The routing module 112 can thereby use the information to manage, navigate, and/or avoid some turns or intersections.

In some routing systems, the layout of an intersection can be inferred based on topology. The topology can provide an indication of whether a turn may be a left or right and the possible degree of the turn. However, the calculation of the layout of the intersection can require significant processing. This can particularly be the case in complex intersections where the intersection may have special lanes for turning left, three or more roads meeting at the intersection, or roads meeting at unusual angles, among other situations. Moreover, the inferences about the intersections based on topology can prove incorrect.

For certain fleet vehicles, certain turns or intersections can be difficult or dangerous for the fleet vehicles to navigate and may desirably be avoided. Further, some turns or intersections can have one or more other advantages or drawbacks useful for consideration in fleet vehicle routing.

The routing module 112, in some embodiments, can access one or more data sets where each street link contains information about an intersection relative to the natural flow (for example, the straight ahead direction) from the link through the intersection. The natural flow can be used to describe the natural path through an intersection. The information can enable the routing module 112 to monitor and anticipate upcoming turns, as well as determine whether a turn may be a left or right relative to the natural flow through an intersection. The information can be used to alleviate processing demands when routing fleet vehicles and make routing decisions at and around intersections simpler, faster, and more accurate.

The routing module 112 can control the path taken through an intersection with significant detail using the stored data set(s) about intersections. For example, the routing module 112 can penalize certain turns, such as by adding time to total route where turns may require crossing traffic travelling in an opposite direction. Additionally or alternatively, the routing module 112 can prevent certain maneuvers, such as U-turns in certain areas.

Figure 13:
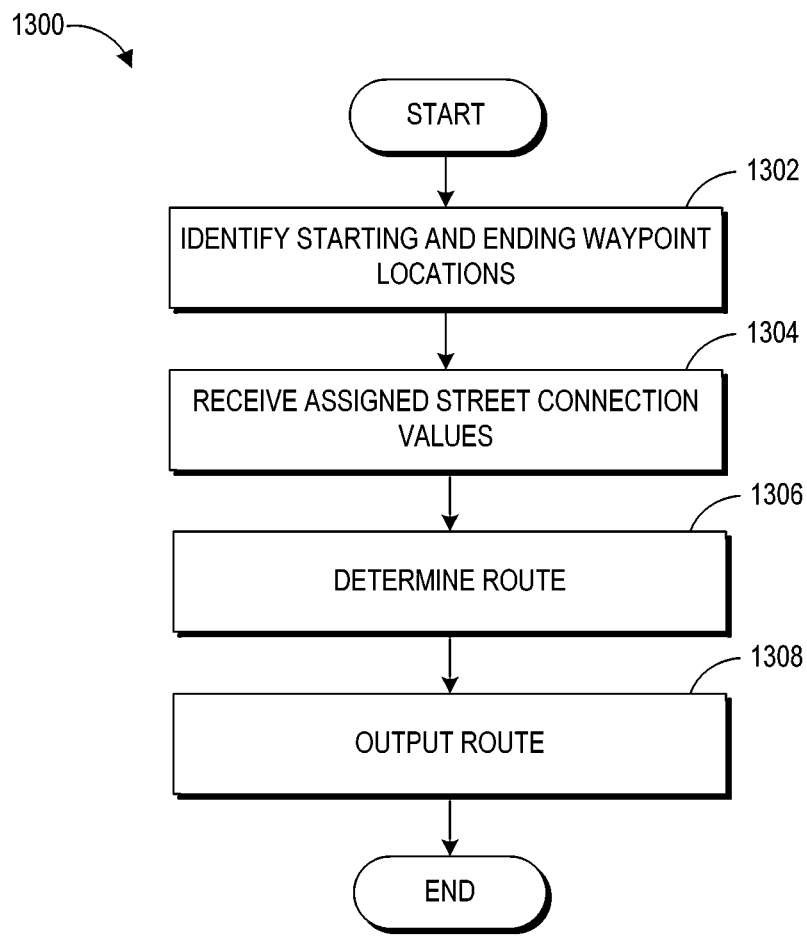
FIG. 13 illustrates a process for determining a route for a fleet vehicle.

FIG. 13 illustrates a process 1300 for determining a route for a fleet vehicle. The process 1300 can be performed by the routing module 112, for instance. At block 1302, the process 1300 identifies starting and ending waypoint locations for the fleet vehicle. At block 1304, the process 1300 receives assigned street link connection values. The assigned street link connection values can include street link connection numbers, turn directions, or sharpness or degree of turns, for instance, as described in this disclosure. At block 1306, the process 1300 determines a route for the fleet vehicle between the starting and ending waypoint locations using the assigned street connection values to limit or favor certain turns or directions of travel in the routing calculations. For example, the fleet vehicle may not be permitted to make left turns, so the routing calculations can exclude all turns indicated to be left turns based on the street link connection values. As another example, certain turns, such as U-turns, can be penalized by adding extra travel time for each U-turn included in determined routes. At block 1308, the determined route is output. In some implementations, the route is output to a navigation device associated with the fleet vehicle for presentation to a driver of the fleet vehicle.

With potentially more than 50 million street links in the United States, the stored data set(s) about intersections can quickly consume vast amounts of computer storage. An example data storage approach can be to encode the data in the form of a series of bits where each bit can represent one or more details of the intersection. Each path through a complex intersection can be stored in about one or two octets or bytes. The first bits of an octet can be indicative of the number of connections (e.g., 1. sharp left turn, 2. left turn, 3. right turn, and 4. straight ahead, can be four connections), and subsequent bits can be indicative of the turn direction or type, among other possibilities. The connections between street links can be assigned numbers, where the natural flow path can be assigned 0 and subsequent paths can be assigned 1, 2, etc. in a clockwise or counter-clockwise manner as illustrated with respect to FIG. 15. The paths can be stored in ascending order based on the assigned connection number. In other embodiments, one or more paths through an intersection can be stored using other storage approaches or data organizations, including less or more detail about the intersection. Further, all street links connecting to an intersection can be assigned numbers in certain implementations to enable information corresponding to the intersection to be stored rather than information related to the natural flow from one street link through the intersection.

Figure 15:
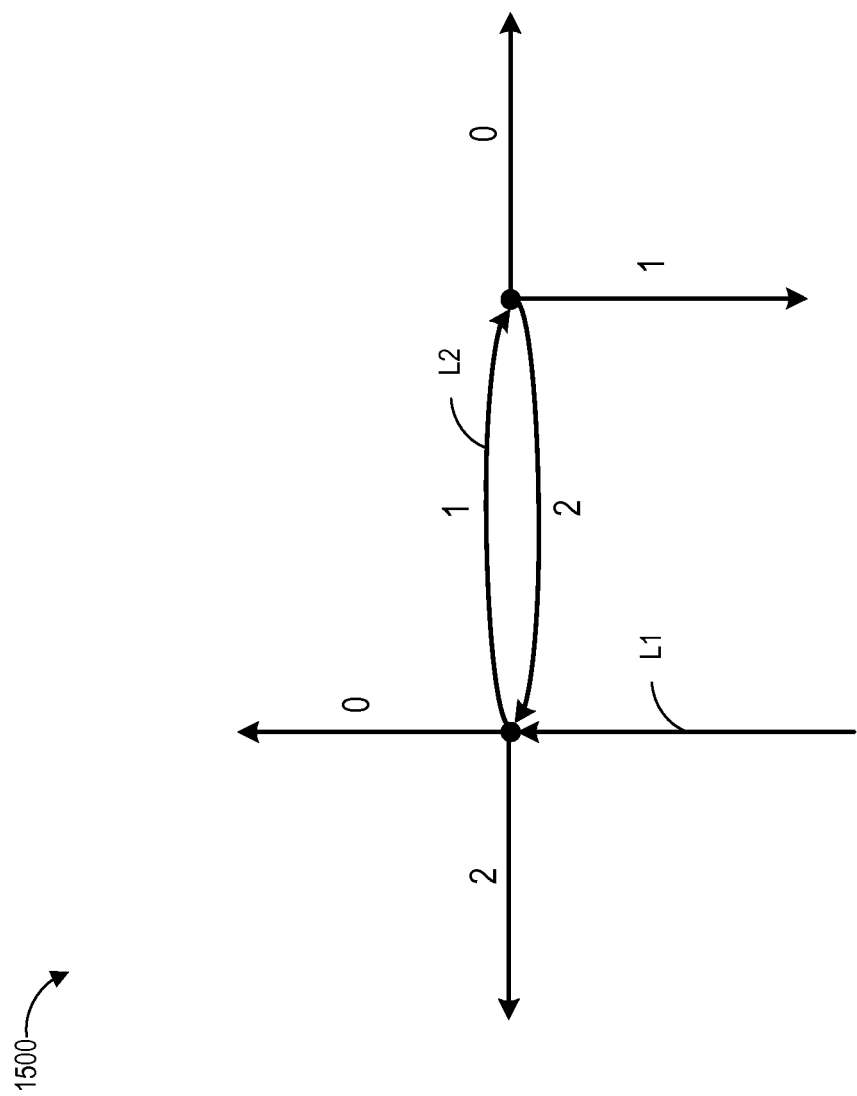
FIG. 15 illustrates an example assignment of numerical values to street links of intersections.

The natural flow through intersections can come in at least two distinct varieties: simple and complex, corresponding to the two intersection types. For simple intersections, for example, data can be stored directly on the street link or outgoing connection of the source intersection as a connection number. This connection number can map to one of the outgoing connections on the target intersection. If a target intersection of connection is a complex intersection, such as is illustrated in FIG. 15, flow data may be stored differently. Each connection can have a table describing the possible out-paths of the intersection paired with a corresponding turn direction and/or sharpness.

Further, a connection can enter a complex intersection if at least one of the outgoing connections of the intersection are InterInter or MultiDigitised. For this case, possible paths through the intersection can be listed. A path ends with a connection that may be not InterInter. Each path can be stored along with a turn type. The following table (Table 1) describes an example storage structure for paths through a complex intersection for a connection. The paths can be stored in ascending order of connection numbers. Moreover, this structure can be followed by an empty nibble to align to the byte boundary.

TABLE 1

| | |
|---|---|
| 1 byte | number of bytes, including the length byte itself |
| 6 bits | number of connections - 1 |
| 1 bit | big connection numbers |
| 1 bit | 0 == right turn, 1 == left turn (if turn type not 0 and not 0xF) |
| 4 bits | turn type: 0 == natural flow, 0xF == U turn, other values indicate increasingly sharper turns |
| 4 or 8 bits * n | a sequence of connection numbers. A series of bytes (not necessarily aligned to the byte boundary) if the "big connection numbers" flag is set. Otherwise a series of nibbles. |

Figure 14:
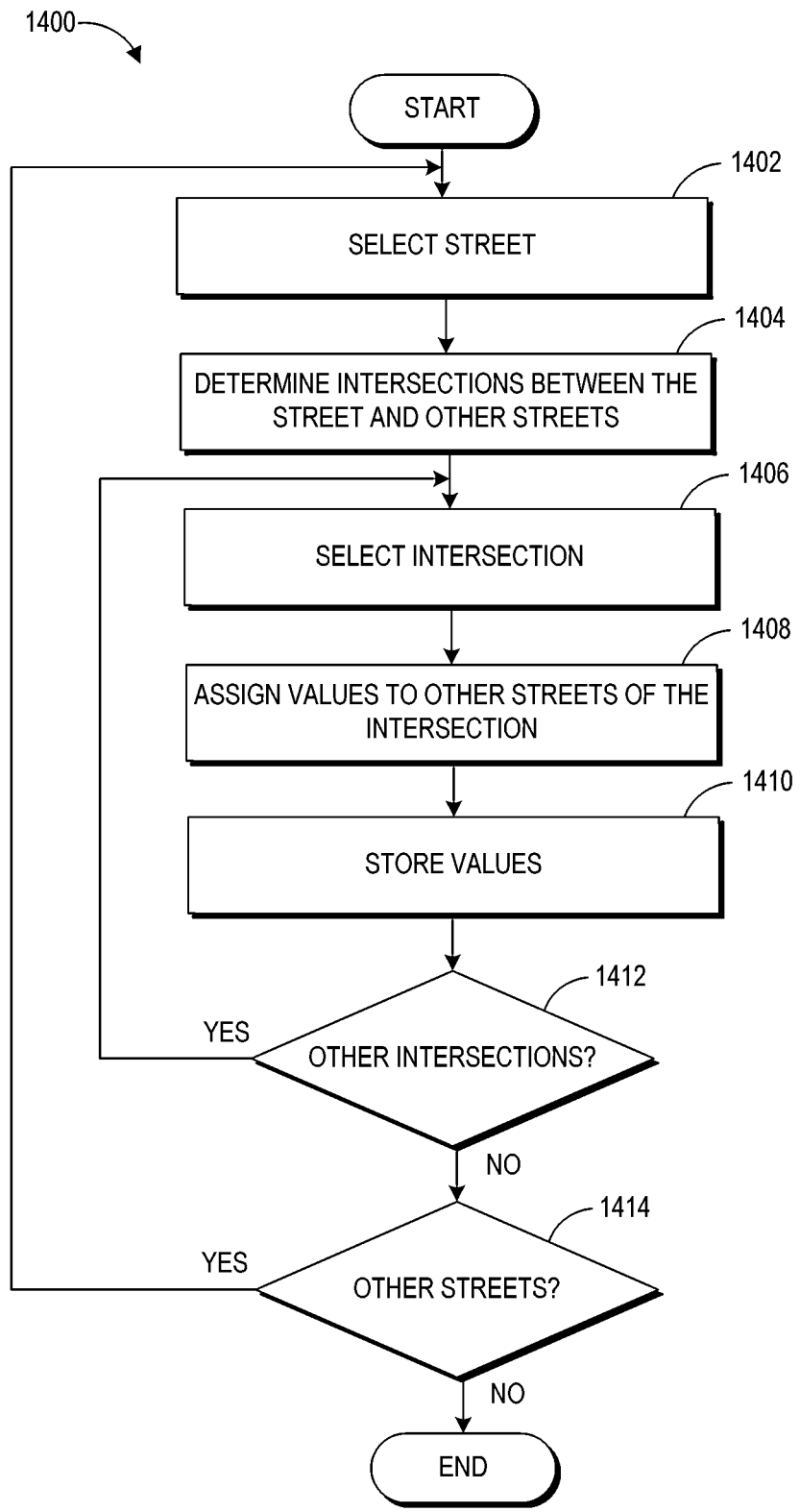
FIG. 14 illustrates a process for analyzing street connections to assign values to street links.

FIG. 14 illustrates a process 1400 for analyzing street connections to assign values to street links. The process 1400 can be performed by the street classification module 128, for instance. At block 1402, the process 1400 selects a street from a network of streets in a geographic region. At block 1404, the process 1400 determines intersections between the selected street and other streets of the network of streets. At block 1406, the process 1400 selects an intersection of the one of more intersections between the selected street and the other streets of the network of streets. At block 1408, the process 1400 assigns values to the other streets of the selected intersection. The values may be indicative of positions of the other streets relative to the selected street. It can be appreciated that other values or information about the other streets relevant to particular applications can be determined and assigned as well. The other values or information can, for instance, include risks of accidents, average stoplight delay, number of turn lanes for a given turn, type of vehicle traffic, or closeness to other streets or intersections, among numerous other possibilities. At block 1410, the process 1400 stores the values from block 1408. In some specific applications (e.g., applications for use by firefighters, construction vehicles, charter airplanes, trains, service vehicles, trucking vehicles, or city workers, etc.), advantageous approaches to storage or subsequent processing of data can be used. For example, specific applications can trigger certain assumptions or values in data that may specifically but not generally apply so that the data set(s) related to specific applications can be compressed or restructured to improve storage or processing. At block 1412, the process 1400 may determine whether to select another intersection between the selected street and the other streets and return to block 1406 to select the another intersection. All intersections between the selected street and the other streets are analyzed in some embodiments, while some intersections but not others are analyzed in other embodiments. At block 1414, the process 1400 may determine whether to select another street from the network of streets. If so, the process 1400 returns to block 1402 and selects the another street. If not, the process 1400 ends.

FIG. 15 illustrates an example assignment of numerical values to street links of two intersections according to the process 1400 of FIG. 14. The first street link analyzed is denoted L1 and has only one intersection with the other streets. This intersection is evaluated and each connecting street link is assigned a numerical value relative to a natural flow through the intersection. The natural flow through the intersection, in this case, is straight-ahead and is assigned a value of 0. The other street links are assigned incrementally higher values of 1 and 2 according to a clockwise assignment approach. These values can then be stored for later use in routing by the routing module 112. This process is then repeated for the street link denoted L2 for the other intersection. The street link straight-ahead from L2 is assigned the value of 0 while the other two street links at the intersection are assigned the values of 1 and 2 according to a clockwise assignment approach.

Figure 16:
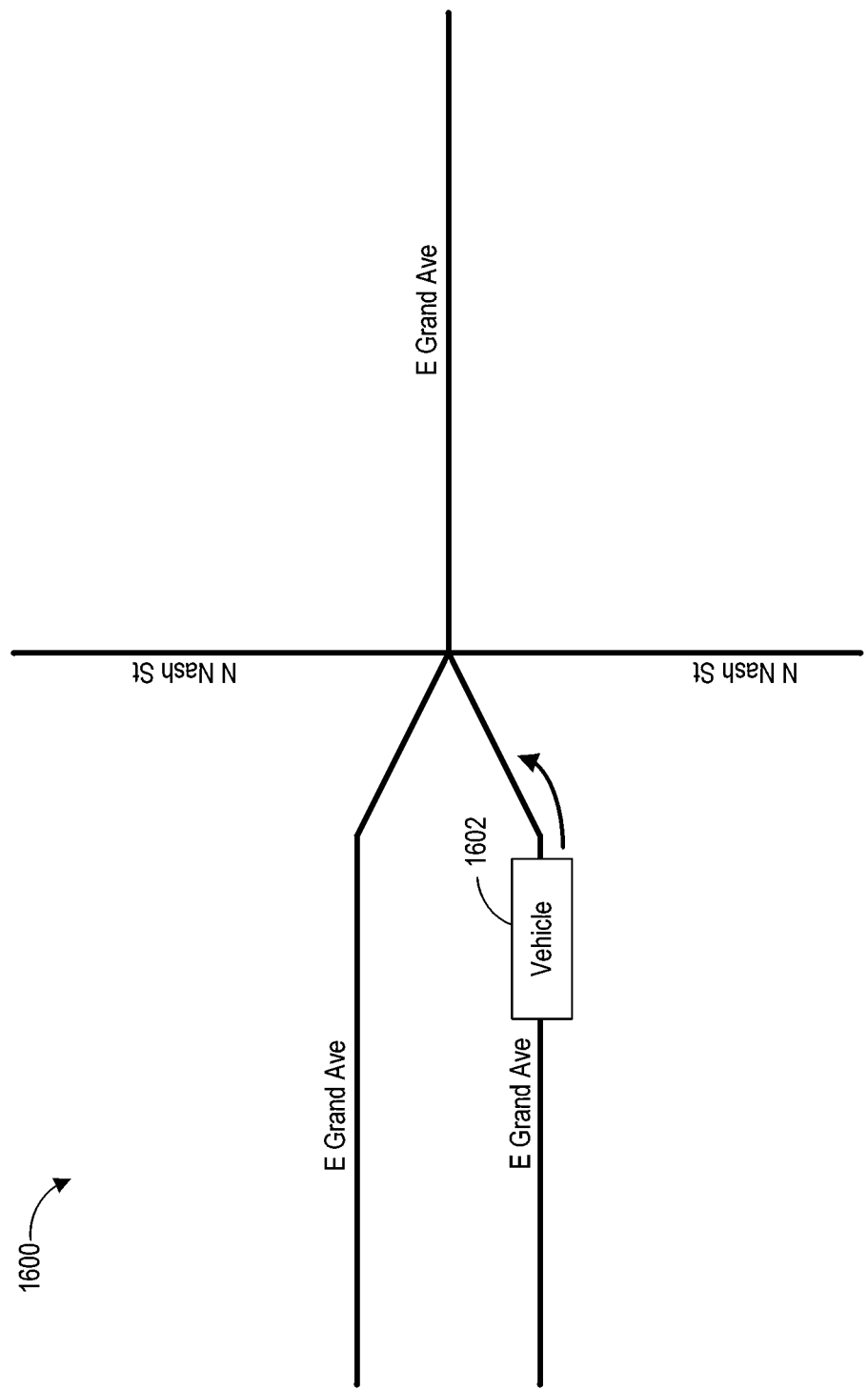
FIG. 16 illustrates an example intersection that may be encountered by a fleet vehicle.

FIG. 16 illustrates an example intersection that may be encountered by a fleet vehicle. Once the vehicle 1602 reaches the intersection, the vehicle 1602 is presented with various options on directions to travel. The vehicle 1602 can proceed ahead on E. Grand Ave, turn right onto N. Nash St. (an example non-crossing turn), or turn left onto N. Nash St. (an example crossing turn). In addition, the vehicle 1602 can make a U-turn and travel the other direction on E. Grand Ave. Each of these pieces of information, such as the order and turn type of street links of the intersection, are examples of information that may be available to the routing module 112 in determining how to route the vehicle 1602. The information can be stored to correspond to the street that the vehicle 1602 is currently travelling on and thus information about the intersection may be separately stored for each street connecting to the intersection. Additionally or alternatively, the information can be stored to correspond to the intersection so that each street connecting to the intersection shares the same data about the intersection.

Figure 17:
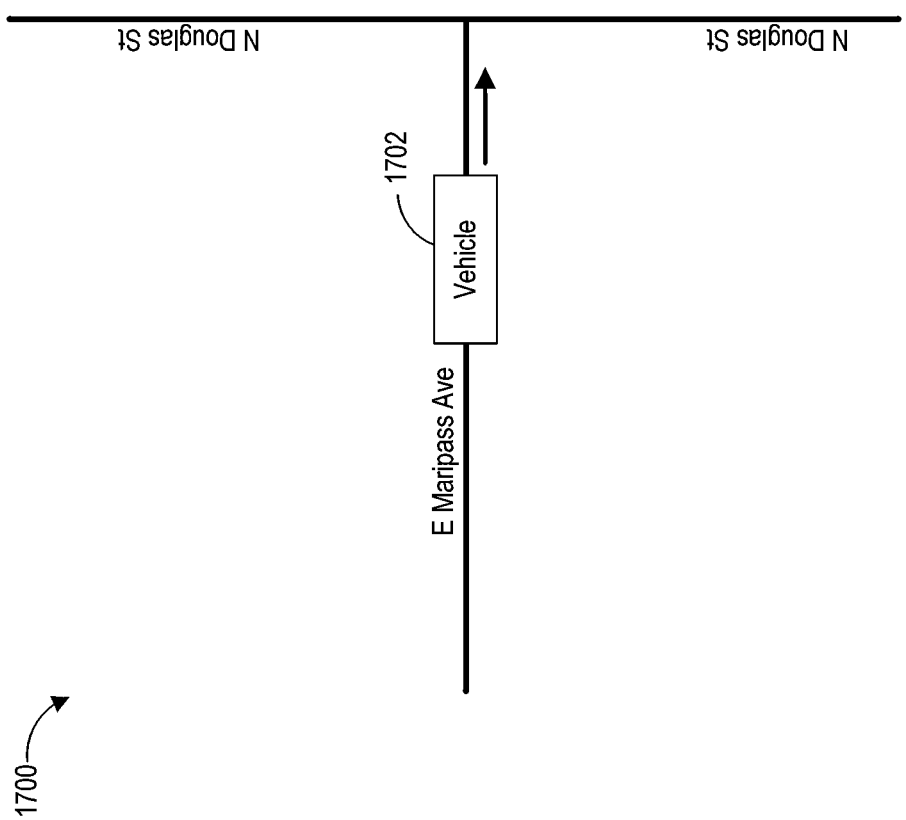
FIG. 17 illustrates an example intersection that may be encountered by a fleet vehicle.

Similarly, FIG. 17 illustrates an example intersection that may be encountered by a fleet vehicle. Once the vehicle 1702 reaches intersection, the vehicle 1702 is presented with options on directions to travel. In this case, the vehicle 1702 may not travel straight since the junction is a T-junction. The vehicle 1702, however, may turn left or right onto N. Douglas St. Further, the vehicle 1702 may not be able to make a U-turn back onto E. MariPass Ave. Each of these components of information, such as the order and turn type of street links of the intersection, are examples of information that may be available to the routing module 112 in determining how to route the vehicle 1702.

V. Terminology

A number of computing systems have been described throughout this disclosure. The descriptions of these systems are not intended to limit the teachings or applicability of this disclosure. For example, the user systems described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems described herein can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description.

What is claimed is:

1. A system for calculating a route for a vehicle, the system comprising:
   a computer system comprising computer hardware configured to:
   determine a first route from a start node toward an end node on a first routing network until a first groove node is reached, the first route connecting the start node and the first groove node on the first routing network, the start node and the end node defining a route to be traveled by a vehicle, the first groove node not being the end node;
   determine a second route from the end node toward the start node on the first routing network until a second groove node is reached, the second route connecting the end node and the second groove node on the first routing network, the second groove node not being the start node;
   determine a groove route from the first groove node to the second groove node on a second routing network, the groove route connecting the first groove node and the second groove node on the second routing network, the second routing network comprising a subset of nodes of the first routing network and fewer road links than the first routing network;
   determine an initial route comprising the first route, the groove route, and the second route, the initial route connecting the start node and the end node;
   revise the initial route to include an alternative route on the first routing network in place of at least a portion of the groove route, wherein the computer system comprising computer hardware is configured to revise the initial route by:
   determining the alternative route from a plurality of road links of the first routing network,
   preferring to incorporate in the alternative route those of the plurality of road links that are closer to the groove route than others of the plurality of road links that are farther from the groove route, and
   preferring to incorporate in the alternative route those of the plurality of road links near the groove route that have a higher road link classification than others of those of the plurality of road links near the groove route; and
   output data representing the revised initial route for presentation to a driver of the vehicle.

2. The system of claim 1, wherein the computer system comprising computer hardware is configured to revise the initial route based at least in part on weather along the groove route.

3. The system of claim 1, wherein the computer system comprising computer hardware is configured to revise the initial route based at least in part on traffic along the groove route.

4. The system of claim 1, wherein the computer system comprising computer hardware is configured to revise the initial route based at least in part on construction along the groove route.

5. The system of claim 1, wherein the computer system comprising computer hardware is configured to revise the initial route based at least in part on an overpass height along the groove route.

6. The system of claim 1, wherein the computer system comprising computer hardware is configured to revise the initial route based at least in part on a fuel efficiency for the vehicle to travel the groove route.

7. The system of claim 1, wherein the nodes of the first routing network comprise intersections of the plurality of road links of the first routing network.

8. The system of claim 1, wherein the computer system comprising computer hardware is configured to select the second routing network from a plurality of groove routing networks based at least in part on a Euclidean distance between the start node and the end node.

9. The system of claim 1, wherein the computer system comprising computer hardware is configured to select the second routing network from a plurality of groove routing networks.

10. The system of claim 1, wherein the computer system comprising computer hardware is configured to revise the initial route using a heat map.

11. A method for calculating a route for a vehicle, the method comprising:

using a computer system comprising computer hardware for:

determining a first route from a start node toward an end node on a first routing network until a first groove node is reached, the first route connecting the start node and the first groove node on the first routing network, the start node and the end node defining a route to be traveled by a vehicle, the first groove node not being the end node;

determining a second route from the end node toward the start node on the first routing network until a second groove node is reached, the second route connecting the end node and the second groove node on the first routing network, the second groove node not being the start node;

determining a groove route from the first groove node to the second groove node on a second routing network, the groove route connecting the first groove node and the second groove node on the second routing network, the second routing network comprising a subset of nodes of the first routing network and fewer road links than the first routing network;

determining an initial route comprising the first route, the groove route, and the second route, the initial route connecting the start node and the end node;

revising the initial route to include an alternative route on the first routing network in place of at least a portion of the groove route, wherein said revising comprises revising the initial route by:

determining the alternative route from a plurality of road links of the first routing network, preferring to incorporate in the alternative route those of the plurality of road links that are closer to the groove route than others of the plurality of road links that are farther from the groove route, and preferring to incorporate in the alternative route those of the plurality of road links near the groove route that have a higher road link classification than others of those of the plurality of road links near the groove route; and outputting data representing the revised initial route for presentation to a driver of the vehicle.

12. The method of claim 11, further comprising selecting the second routing network from a plurality of groove routing networks based at least in part on a Euclidean distance between the start node and the end node.

13. The method of claim 11, wherein said revising comprises revising the initial route using a heat map.

14. Non-transitory physical computer storage comprising instructions stored thereon for implementing, in one or more processors, a process for calculating a route for a vehicle, the process comprising:

determining a first route from a start node toward an end node on a first routing network until a first groove node is reached, the first route connecting the start node and the first groove node on the first routing network, the start node and the end node defining a route to be traveled by a vehicle, the first groove node not being the end node;

determining a second route from the end node toward the start node on the first routing network until a second groove node is reached, the second route connecting the end node and the second groove node on the first routing network, the second groove node not being the start node;

determining a groove route from the first groove node to the second groove node on a second routing network, the groove route connecting the first groove node and the second groove node on the second routing network, the second routing network comprising a subset of nodes of the first routing network and fewer road links than the first routing network;

determining an initial route comprising the first route, the groove route, and the second route, the initial route connecting the start node and the end node;

revising the initial route to include an alternative route on the first routing network in place of at least a portion of the groove route, wherein said revising comprises revising the initial route by:

determining the alternative route from a plurality of road links of the first routing network, preferring to incorporate in the alternative route those of the plurality of road links that are closer to the groove route than others of the plurality of road links that are farther from the groove route, and preferring to incorporate in the alternative route those of the plurality of road links near the groove route that have a higher road link classification than others of those of the plurality of road links near the groove route; and outputting data representing the revised initial route for presentation to a driver of the vehicle.

15. The non-transitory physical computer storage of claim 14, wherein the process further comprises selecting the second routing network from a plurality of groove routing networks.

16. The non-transitory physical computer storage of claim 14, wherein said revising comprises revising the initial route using a heat map.

* * * * *